(12) United States Patent
Chen et al.

(10) Patent No.: US 9,405,178 B2
(45) Date of Patent: Aug. 2, 2016

(54) LIGHT EMITTING DIODE PROJECTION LAMP

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Mi-Chien Chen, New Taipei (TW); Shien-Cheng Kuo, New Taipei (TW); Juan Mo, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 120 days.

(21) Appl. No.: 14/509,440

(22) Filed: Oct. 8, 2014

(65) Prior Publication Data

US 2015/0153635 A1    Jun. 4, 2015

(30) Foreign Application Priority Data

Nov. 29, 2013  (CN) .......................... 2013 1 06195367

(51) Int. Cl.
| | |
|---|---|
| *F21V 5/04* | (2006.01) |
| *G03B 21/16* | (2006.01) |
| *G03B 21/20* | (2006.01) |
| *F21V 21/32* | (2006.01) |
| *F21V 29/71* | (2015.01) |
| *F21V 29/74* | (2015.01) |
| *F21V 29/80* | (2015.01) |
| *F21V 15/01* | (2006.01) |
| *F21V 17/16* | (2006.01) |
| *F21Y 101/02* | (2006.01) |
| *F21V 29/507* | (2015.01) |

(52) U.S. Cl.
CPC ................ *G03B 21/16* (2013.01); *F21V 21/32* (2013.01); *F21V 29/713* (2015.01); *F21V 29/74* (2015.01); *F21V 29/80* (2015.01); *G03B 21/2033* (2013.01); *G03B 21/2046* (2013.01); *G03B 21/2093* (2013.01); *F21V 5/04* (2013.01); *F21V 15/01* (2013.01); *F21V 17/164* (2013.01); *F21V 29/507* (2015.01); *F21Y 2101/02* (2013.01)

(58) Field of Classification Search
CPC ......... F21V 5/04; F21V 15/01; F21V 17/164; F21V 21/32; F21V 29/74; F21V 29/80; F21V 29/507; F21V 29/713; F21V 2101/02; G03B 21/16; G03B 21/2033; G03B 21/2046; G03B 21/2093
See application file for complete search history.

(56) References Cited

U.S. PATENT DOCUMENTS

| | | | | |
|---|---|---|---|---|
| 7,980,732 B2* | 7/2011 | Kawamura | .......... | F21S 48/1159 362/308 |
| 8,683,683 B2* | 4/2014 | Knoll | ..................... | F21V 17/06 29/739 |
| 8,878,435 B2* | 11/2014 | Demuynck | ........... | F21V 23/006 315/113 |

*Primary Examiner* — Stephen F Husar
(74) *Attorney, Agent, or Firm* — ScienBiziP, P.C.

(57) ABSTRACT

A projection lamp utilizing light emitting diodes (LEDs) includes a housing, a lamp board positioned on the housing, an upper covering the lamp board, and a lens positioned above the upper cover. The lamp board includes a plurality of LEDs. A majority portion of the housing and the upper cover is composed of thermally conductive materials. The housing includes a plurality of latch holes, the upper cover includes a plurality of latching chambers corresponding to the latch holes, and the lens includes a plurality of latching members extending through the latching chambers to engage the housing latch holes.

16 Claims, 11 Drawing Sheets

LIGHT EMITTING DIODE PROJECTION LAMP

FIELD

The subject matter herein generally relates to light sources of projector devices.

BACKGROUND

LEDs have been employed as a light source in projection lamps. Heat dissipation is an issue to be addressed in the manufacturing of an LED projection lamp. A heat dissipating structure can be disposed below an LED module in the LED projection lamp to avoid overheating and a consequent reduction in length of service life of the LED module.

BRIEF DESCRIPTION OF THE DRAWINGS

Implementations of the present technology will now be described, by way of example only, with reference to the attached figures.

DETAILED DESCRIPTION

Figure 1:
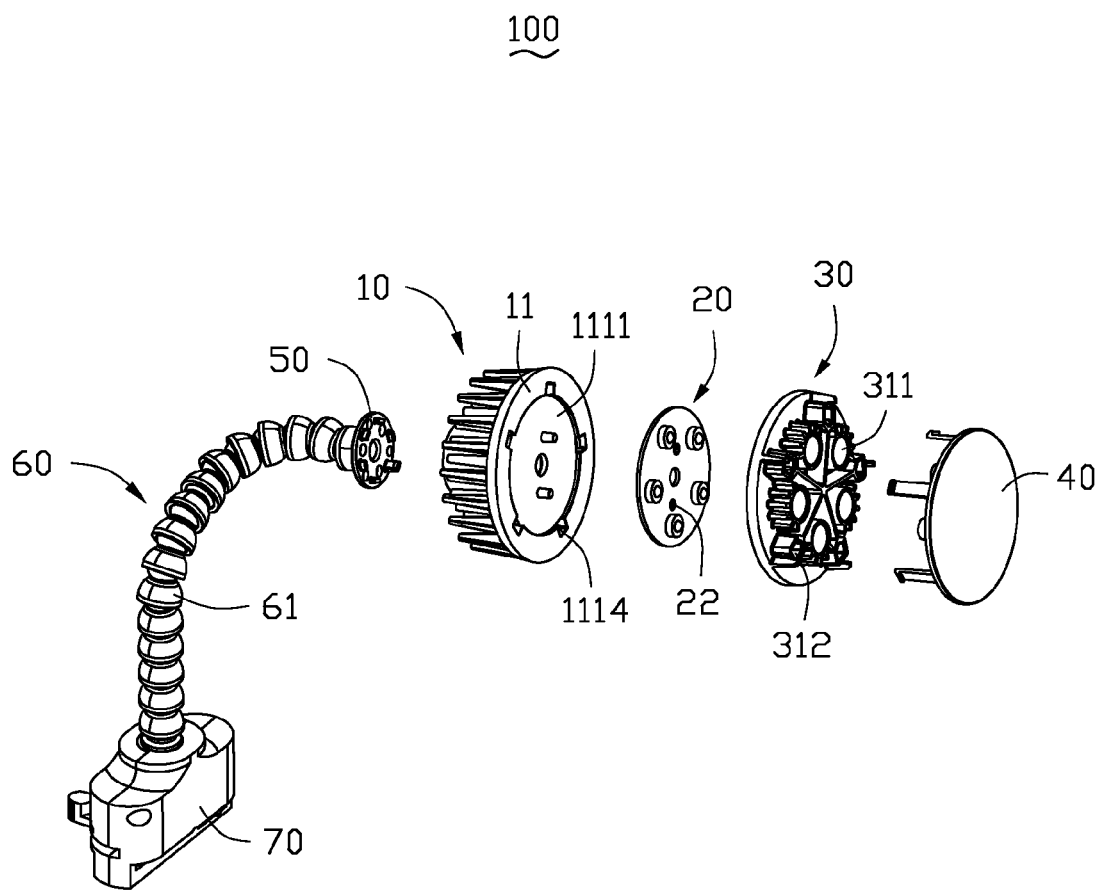
FIG. 1 is an exploded isometric view of an embodiment of an LED projection lamp.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that is modified by the word "substantially", such that the feature of the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

FIG. 1 illustrates an LED projection lamp 100 including a housing 10, a lamp board 20, an upper cover 30, a lens 40, a lower cover 50, a lamp pole 60, and a base 70. One end of the lamp pole 60 can be coupled to the base 70, and another end of the lamp pole 60 can be coupled to the bottom cover 50. The lamp pole 60 can be made of a flexible plastic material, and can include a plurality of connecting parts 61 movably connected in turn, and the connecting part 61 can be bowl-shaped. Therefore, the bending angle and a height of the lamp pole 60 can be adjusted freely. In at least one embodiment, the lamp pole 60 can be made of polyformaldehyde.

Figure 2:
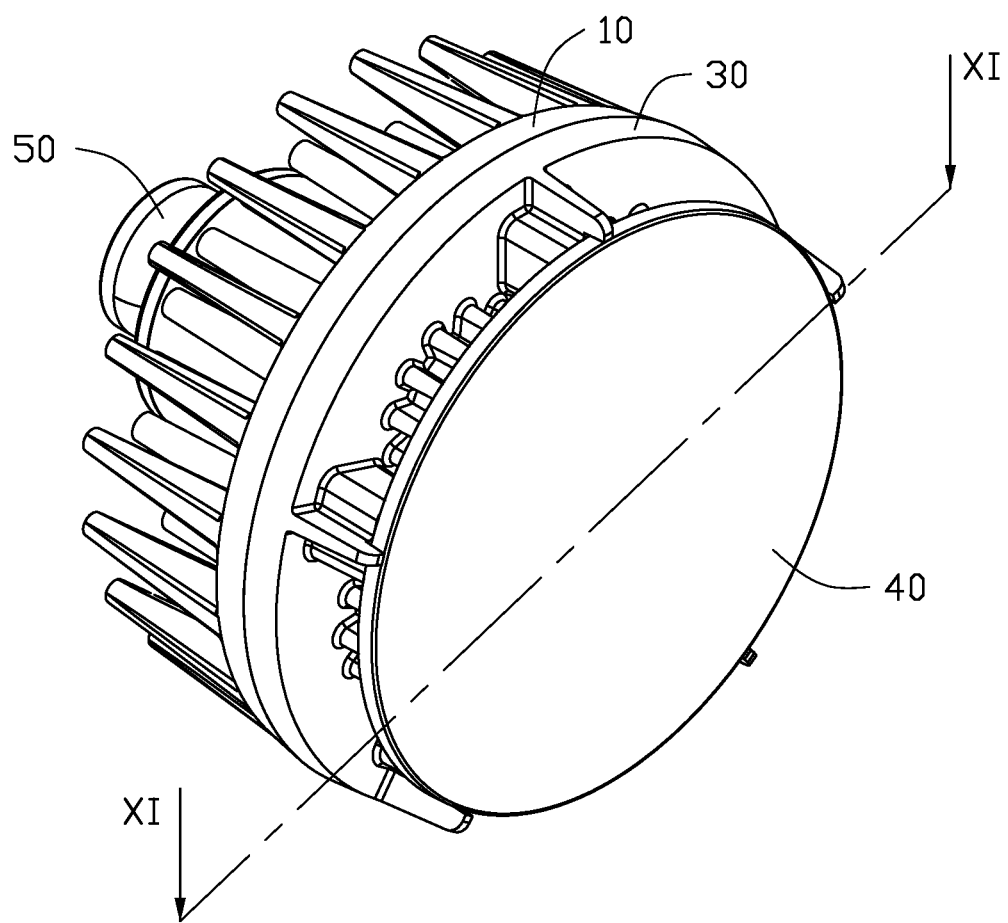
FIG. 2 is an isometric view of a portion of the LED projection light of FIG. 1.

FIG. 2 illustrates an assembly of the lower cover 50, the housing 10, the upper cover 30, and the lens 40. The lower cover 50 can be connected to the housing 10, and the upper cover 30 can be coupled with the housing 10. The lens 40 can be mounted on the upper cover 30. The lamp board 20 (see FIG. 1) can be positioned between the housing 10 and the upper cover 30.

Figure 3:
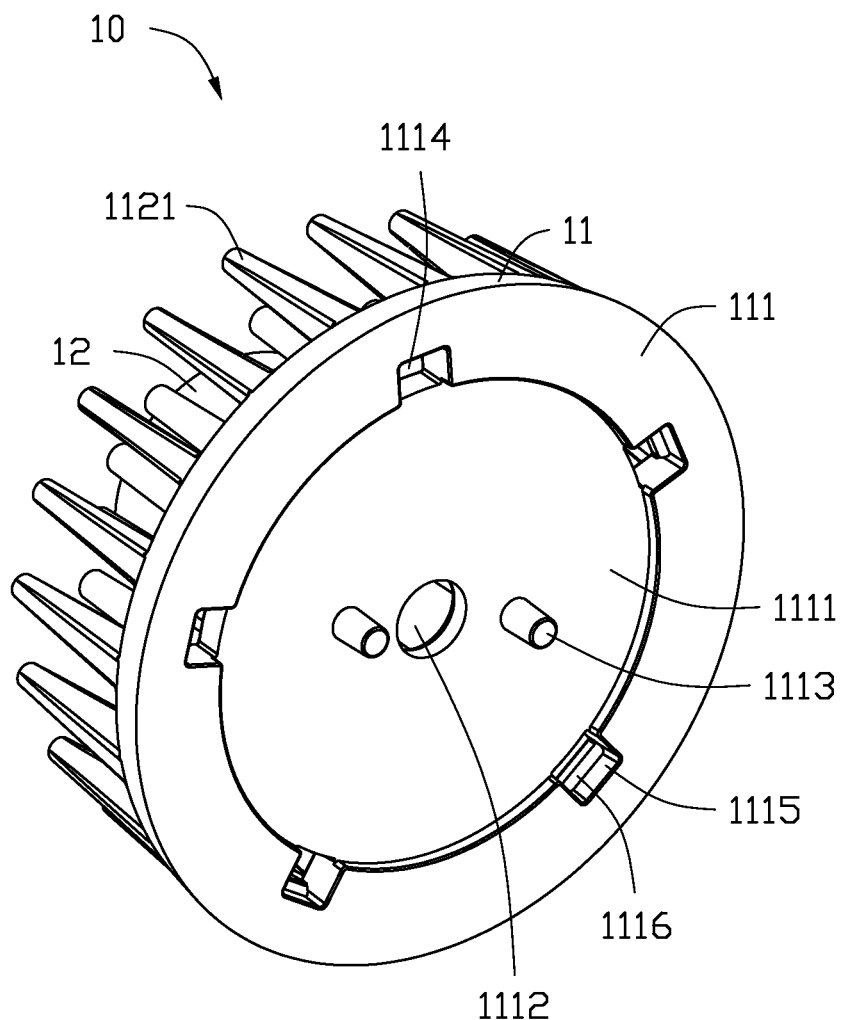
FIG. 3 is an isometric view of a housing of the LED projection light shown in FIG. 1.

FIG. 3 illustrates the housing 10 including a plate 11 and a protrusion part 12 positioned in the central portion of the plate 11. The plate 11 can be substantially circular, and a upper surface 111 of the plate 11 can define a first concave portion 1111. The first concave portion 1111 can be substantially circular and can define a first through hole 1112 enabling a plurality of wires (not shown) to pass through. The first through hole 1112 can be defined in the center of the first concave portion 1111. The upper surface 111 can further define two positioning columns 1113 near the first through hole 1112, and a plurality of latch holes 1114 along a periphery of the first concave portion 1111. The positioning columns 1113 can be symmetrical to the first through hole 1112. The latch holes 1114 can be substantially rectangular. An inner surface 1115 of the latch hole 1114 away from the first through hole 1112 can define a stepped groove 1116.

Figure 4:
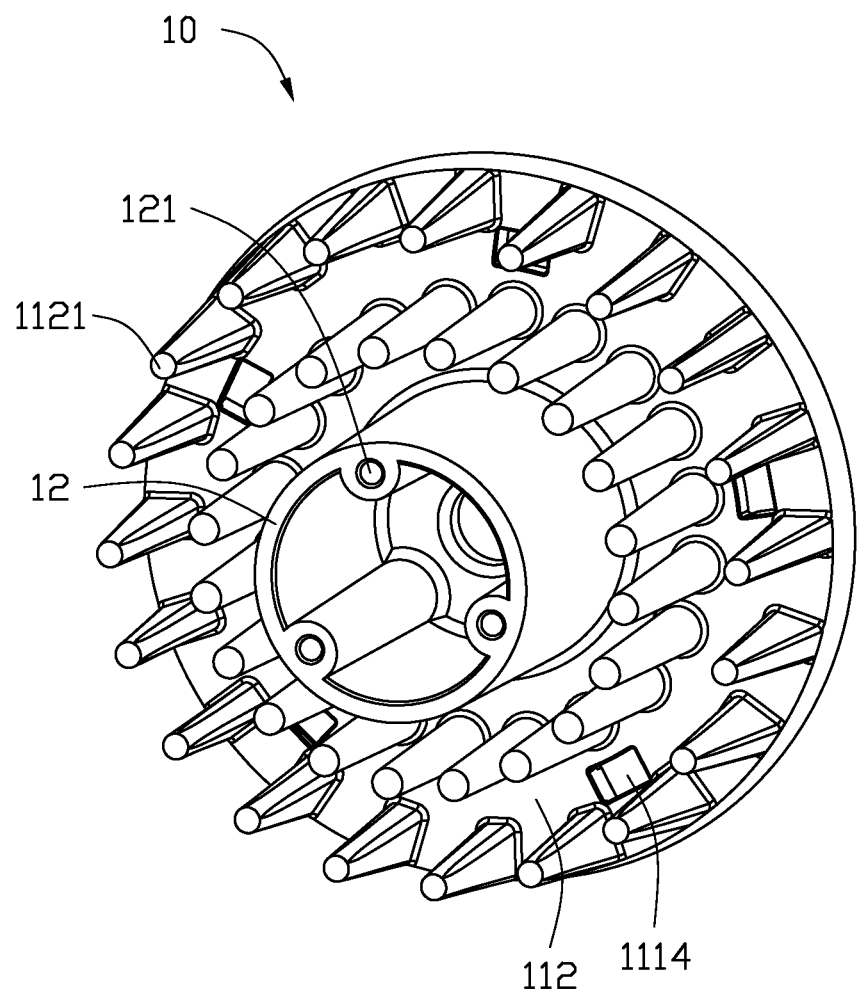
FIG. 4 is an isometric view of the housing of the LED projection light shown in FIG. 1 from the another angle.

FIG. 4 illustrates the protrusion part 12 protruding out of a lower surface 112 of the housing 10 to couple with the lower cover 50. The protrusion part 12 can define at least one threaded hole 121. The lower surface 112 of the housing 10 can further include a plurality of outwardly extending extensions 1121 which aid in heat dissipation. The extensions 1121 can be spikes or in the shape of columns substantially parallel to the protrusion part 12. The extensions 1121 can be spaced from each other. A majority portion of the housing 10 can be composed of thermally conductive material. In at least one embodiment, the housing 10 can be integrally formed of polyamide doped with graphite.

Figure 5:
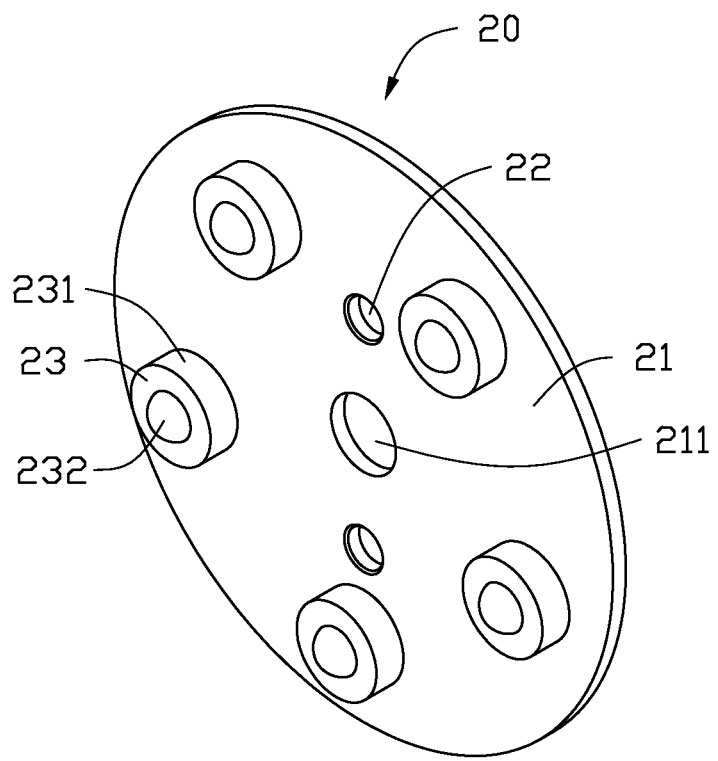
FIG. 5 is an isometric view of a lamp board of the LED projection light shown in FIG. 1.

FIG. 5 illustrates that the lamp board 20 can be a circular plate and can include a second through hole 211 corresponding to the first through hole 1112 as shown in FIG. 3. The lamp board 20 can include two positioning holes 22 corresponding to the positioning columns 1113 and a plurality of LEDs 23 attached to a first surface 21 facing away from the housing 10. A diameter of the lamp board 20 can be slightly smaller than a diameter of the first concave portion 1111, such that the lamp board 20 can be positioned in the first concave portion 1111. Each of the LEDs 23 can include a base portion 231 and a light-emitting portion 232 surrounded by the base portion 231. The base portion 231 can be hollow and substantially in the shape of a column, and the light-emitting portion 232 can be a domed protrusion. The lamp board 20 can be made of a metal which has a good thermal conductivity, such as aluminum.

Figure 6:
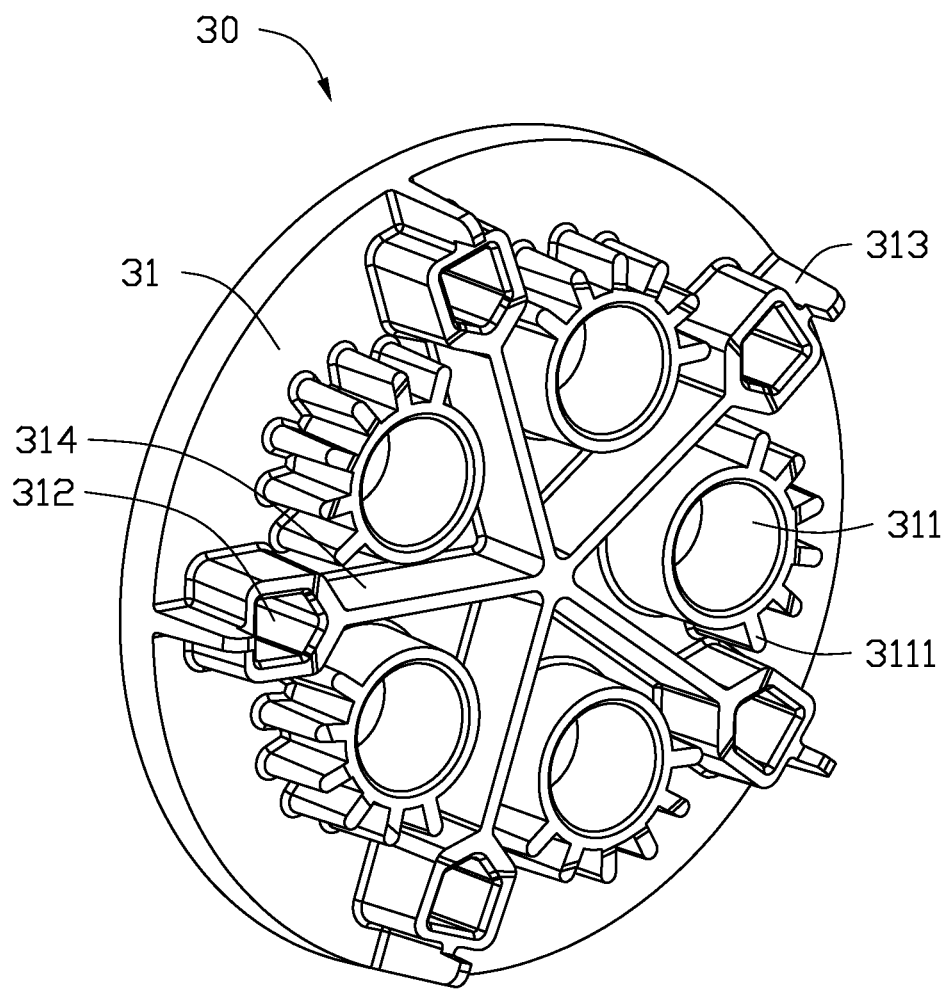
FIG. 6 is an isometric view of an upper cover of the LED projection light shown in FIG. 1.

FIG. 6 illustrates that the upper cover 30 can be substantially disk-shaped and include a plurality of lamp chambers 311 vertically extending from a first surface 31 away from the lamp board 20. The lamp chambers 311 can be positioned to correspond to the LEDs 23 and can be hollow and substantially in the shape of a column, whereby each LED 23 can be received in a lamp chamber 311. A diameter of the lamp chamber 311 can be larger than a diameter of the base portion 231 of the LED 23. One or more of the lamp chambers 311 can include a plurality of cooling fins 3111 on the part of an outer surface away from the center of the upper cover 30.

The upper cover 30 can further include a plurality of latching chambers 312, a plurality of latching plates 313, and a plurality of separation plates 314 vertically extending from the first surface 31. The separation plates 314 can radiate out from the center of the upper cover 30. Each of latching chambers 312 can be pentagonal in shape and connected with one end of the separation plate 314, and the latching chambers 312 can be positioned to correspond to the latch holes 1114. The latching plates 313 can be positioned at the edge of the upper cover 30, and each of the latching plates 313 can be connected with one of the latching chambers 312. A height of the latching chamber 312 can be substantially equal to a height of the lamp chamber 311, and the latching plate 313 can be higher than the latching chamber 312, whereby the lens 40 covering the upper cover 30 can be clasped by the latching plates 313. Each lamp chamber 311 can be positioned between two separation plates 314.

Figure 7:
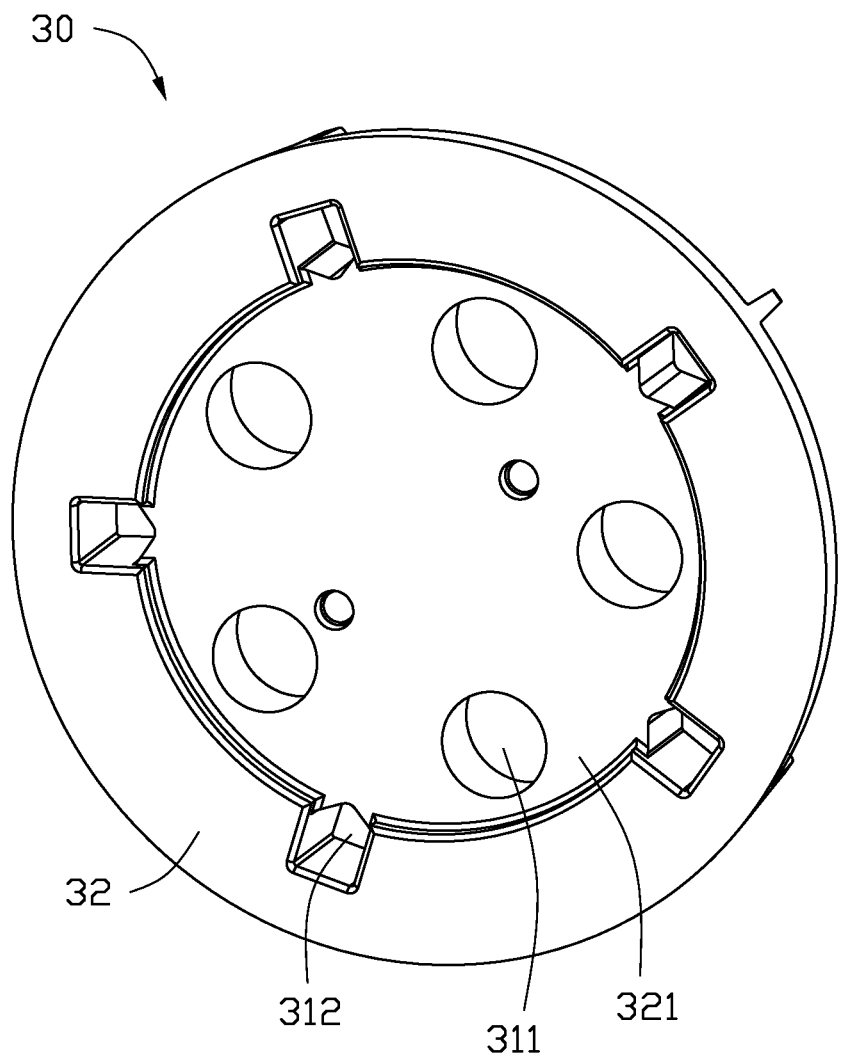
FIG. 7 is an isometric view of the upper cover of FIG. 6 from another angle.

FIG. 7 illustrates that the upper cover 30 can include a second surface 32 opposite to the first surface 31, as shown in FIG. 6. The second surface 32 can include a second concave portion 321 in the central portion, and a diameter of the second concave portion 321 can be slightly smaller than a diameter of the first concave portion 1111 of the housing 10. The latching chambers 312 can be positioned at the fringe of the second concave portion 321. The lamp chambers 311 and the latching chambers 312 can actually be through holes (not labeled) in the upper cover 30. A majority portion of the upper cover 30 can be composed of thermally conductive material. In at least one embodiment, the upper cover 30 can be made of polyamide doped with graphite. In other embodiments, the upper cover 30 can be made of other thermally conductive plastic polymers. The upper cover 30 can substantially cover the first surface 21 of the lamp board 20, and can be positioned between the lamp board 20 and the lens 40.

Figure 8:
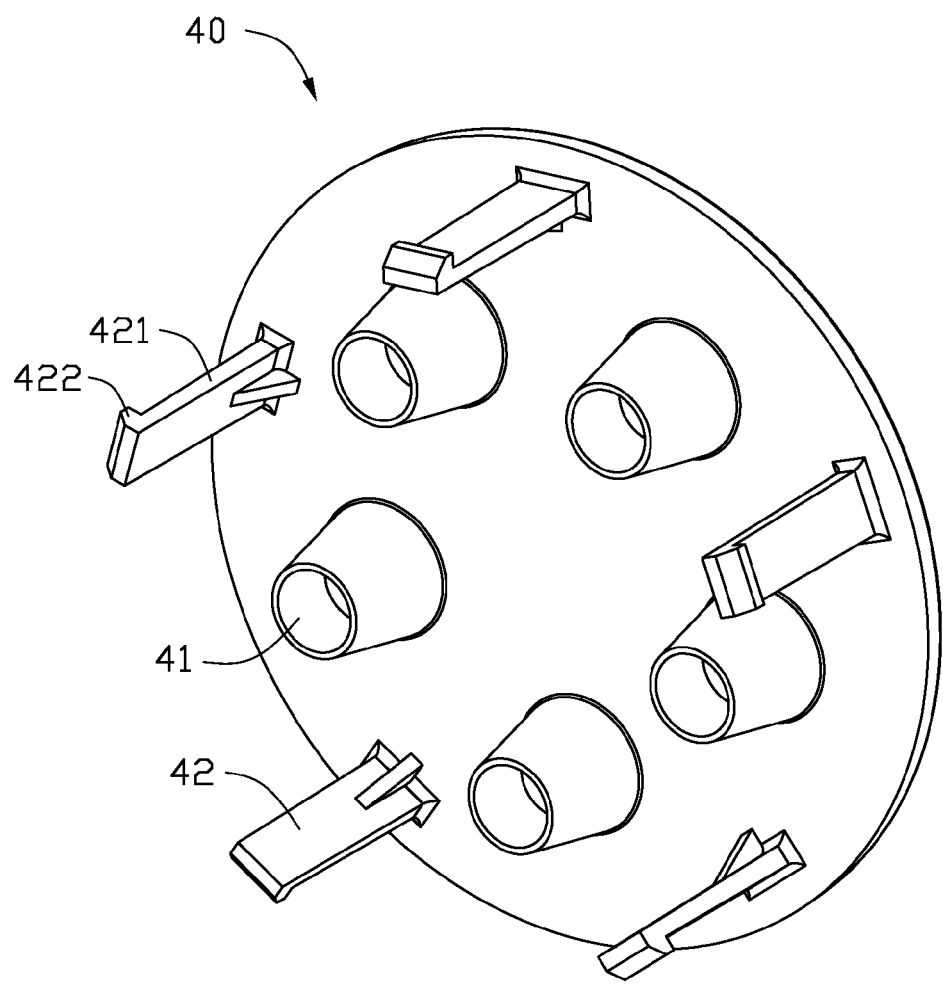
FIG. 8 is an isometric view of a lens of the LED projection light shown in FIG. 1.

FIG. 8 illustrates that the lens 40 can be a substantially disk-shaped sheet and include a plurality of receiving chambers 41 and a plurality of latching members 42. The receiving chambers 41 can be positioned to correspond to the lamp chambers 311 and be hollow and substantially in the shape of a column. The receiving chamber 41 and the latching members 42 can be substantially perpendicular to a surface (not labeled) of the lens 40. An outer diameter of the receiving chamber 41 can be smaller than an inner diameter of the lamp chamber 311, and an inner diameter of the receiving chamber 41 can be larger than a diameter of the light-emitting part 232. The latching members 42 can be positioned to correspond with the latching chambers 312. Each latching member 42 can be positioned at the periphery of the lens 40 and can include a latching portion 421 and a hook portion 422 at a distal end. A length of the latching portion 421 can be equal to a total depth of the latch hole 1114 and the latching chamber 312. The lens 40 can be integrally formed of polycarbonate.

Figure 9:
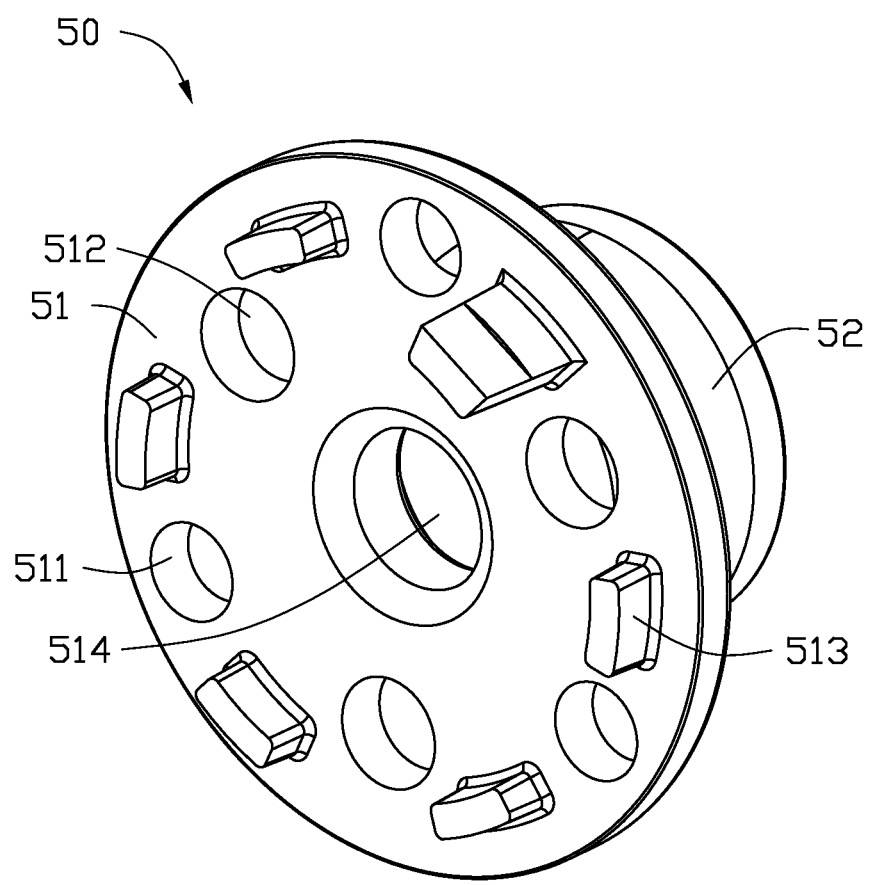
FIG. 9 is an isometric view of a lower cover of the LED projection light shown in FIG. 1.

FIG. 9 illustrates that the lower cover 50 can include a fixing portion 51 and a connecting portion 52. The fixing portion 51 can be disk shaped and have a diameter substantially the same as a diameter of the protrusion part 12. The fixing portion 51 can include a plurality of fixing holes 511, at least one heat dissipation hole 512, a plurality of protrusions 513, and a third through hole 514. The fixing holes 511 can be positioned at the periphery, corresponding to the threaded holes 121, and thereby the lower cover 50 can be assembled to the housing 10 by screws (not shown). The at least one heat dissipation hole 512 can be positioned near the center of the lower cover 50. The protrusions 513 can be positioned at the periphery to correspond to an inner surface (not labeled) of the protrusion part 12, whereby the protrusions 513 can resist against the inner surface of the protrusion part 12 when the lower cover 50 is assembled to the housing 10. The third through hole 514 can be positioned in the center of the lower cover 50, to correspond to and mate with the first through hole 1112.

Figure 10:
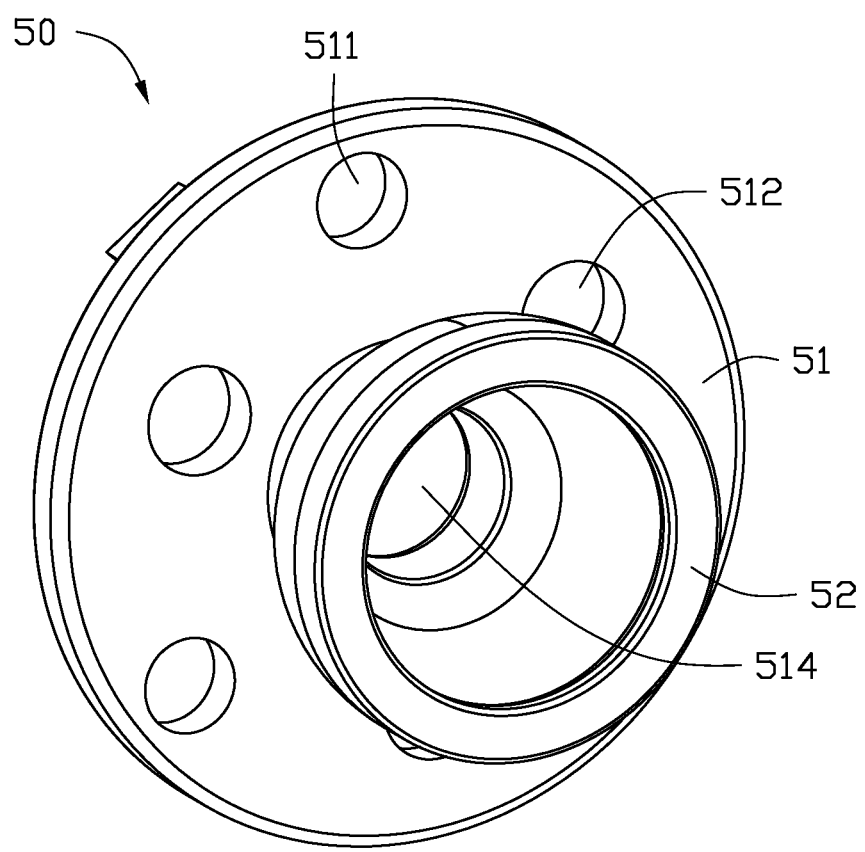
FIG. 10 is an isometric view of the lower cover of FIG. 9 from another perspective.

FIG. 10 illustrates that the connecting portion 52 can be bowl-shaped, and the third through hole 514 can extend through the fixing portion 51 and the connecting portion 52. The lower cover 50 can be integrally formed of polyformaldehyde.

Figure 11:
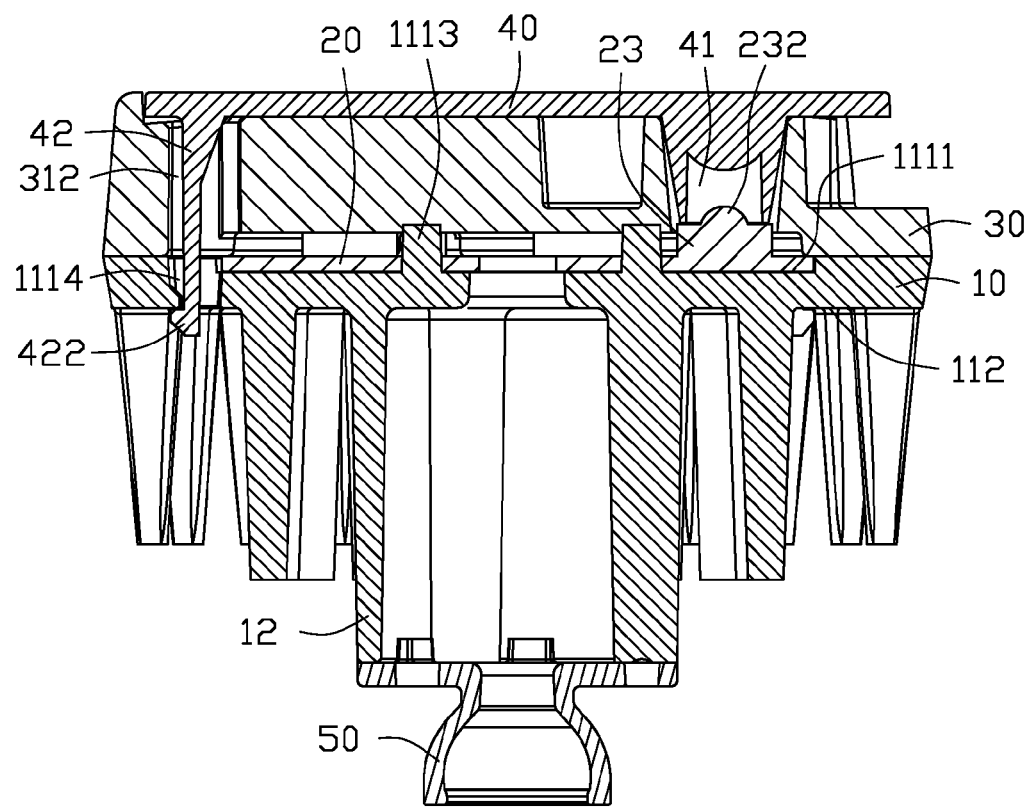
FIG. 11 is a cross-sectional view of the LED projection lamp of FIG. 2 taken along a line XI-XI of FIG. 2.

FIG. 11 illustrates the assembly of the housing 10, the lamp board 20, the upper cover 30, the lens 40, and the lower cover 50. Referring to FIG. 1 and FIG. 11, the lamp board 20 can be assembled to concave portion 1111 of the housing 10, and the positioning columns 1113 can be inserted in the positioning holes 22 of the lamp board 20. In at least one embodiment, the concave portion 1111 can be coated with an adhesive layer. The upper cover 30 can then be mounted on the lamp board 20, whereby each of the LEDs 23 can be received in the lamp chambers 311, and the latching chamber 312 can be aligned to the latch holes 1114. The lamp board 20 can then be received in the space between the concave portion 1111 of the housing 10 and the concave part 32 of the upper cover 30.

The lens 40 can be mounted on the upper cover 30. The latching members 42 can extend through the latching chambers 312 to engage the latch holes 1114. The hook portion 422 can be hooked by the lower surface 112 of the housing 10 away from the lamp board 20. Each of the receiving chambers 41 can be snapped into place in one of the lamp chambers 311, and the light emitting-part 232 can be received in the receiving chamber 41. Then, the lower cover 50 can be mounted on the protrusion part 12 of the housing 10. One end of the lamp pole 60 can be coupled to the connecting portion 52 of the lower cover 50, and the other end of the lamp pole 60 can be mounted on the base 70. The LED projection lamp 100 can then be assembled.

The LED projection lamp can be assembled utilizing the latching structures of the housing, the upper cover, and the lens, so the LED projection lamp has the advantages of simple and convenient assembly. As the housing and the upper cover can be made of thermally conductive plastic materials, and the housing and the upper cover can include a plurality of heat dissipation columns, the LED projection lamp is not only light in weight but has high heat dissipating properties. Furthermore, the lamp pole can be freely adjusted to adjust the emitting angle of the LED projection lamp.

The embodiments shown and described above are only examples. Many details are often found in the art such as the other features of a LED projection lamp. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A light emitting diode projection lamp comprising:
    a housing substantially composed of thermally conductive material;
    a lamp board positioned on the housing;
    a plurality of light emitting diodes attached to a first surface of the lamp board facing away from the housing;
    a lens above, and substantially covering, the first surface of the lamp board, with the lens having a plurality of latching members extending outward from the periphery of the lens toward the housing; and
    an upper cover substantially covering the first surface of the lamp board positioned between the lamp board and the lens and substantially composed of thermally conductive material;
    wherein, the housing includes a plurality of latch holes, the upper cover includes a plurality of latching chambers and the lens latching members extend through the latching chambers to engage the housing latch holes.

2. The LED projection lamp of claim 1, wherein the housing further comprises a plurality of outwardly extending extensions aiding in heat dissipation.

3. The LED projection lamp of claim 2, wherein the extensions are column or spike shaped.

4. The LED projection lamp of claim 1, wherein the housing further comprises a plate, and at least one positioning column vertically extending from the plate.

5. The LED projection lamp of claim 4, wherein the lamp board further comprises at least one positioning hole corresponding to the positioning column, and the positioning column is inserted into the positioning hole.

6. The LED projection lamp of claim 1, wherein the housing further comprises a first concave portion in the central portion, and the upper cover further comprises a second concave portion in the central portion; the lamp board is positioned in a space between the housing and the upper cover.

7. The LED projection lamp of claim 1, wherein the upper cover further comprises a plurality of latching plates positioned at a periphery of the upper cover; the latching plates are connected with the latching chambers and higher than the latching chambers.

8. The LED projection lamp of claim 1, wherein the upper cover further comprises a plurality of separation plates radiated out from the center of the upper cover.

9. The LED projection lamp of claim 1, wherein the upper cover further comprises a plurality of lamp chambers corresponding to the LEDs, and each of the LEDs is received in one of the lamp chambers.

10. The LED projection lamp of claim 9, wherein the each of the lamp chambers comprises a plurality of cooling fins.

11. The LED projection lamp of claim 9, wherein the lens further comprises a plurality of receiving chambers corresponding to the lamp chambers, and each of the receiving chamber is snapped in one of the lamp chambers.

12. The LED projection lamp of claim 1, wherein the latching member comprises a latching portion and a hook portion at a distal end; the hook portion is hooked by a lower surface of the housing away from the lamp board.

13. The LED projection lamp of claim 1, wherein the LED projection lamp further comprises a lower cover connected to the housing; the lower cover comprises at least one heat dissipation hole.

14. The LED projection lamp of claim 13, wherein the housing further comprises a protrusion part protruded out of the housing; the lower cover further comprises at least one protrusion resist against the protrusion part.

15. The LED projection lamp of claim 13, wherein the LED projection lamp further comprises a lamp pole and a base; the lamp pole comprises a plurality of connecting members movably connected one by one; the lamp pole is connected with the lower cover.

16. The LED projection lamp of claim 1, wherein the housing and the upper cover are made of polyamide doping with graphite.

* * * * *